No. 614,859. Patented Nov. 29, 1898.
W. GUTENKUNST.
FEEDER FOR CORN HUSKING MACHINES.
(Application filed June 1, 1897.)
(No Model.) 3 Sheets—Sheet 1.
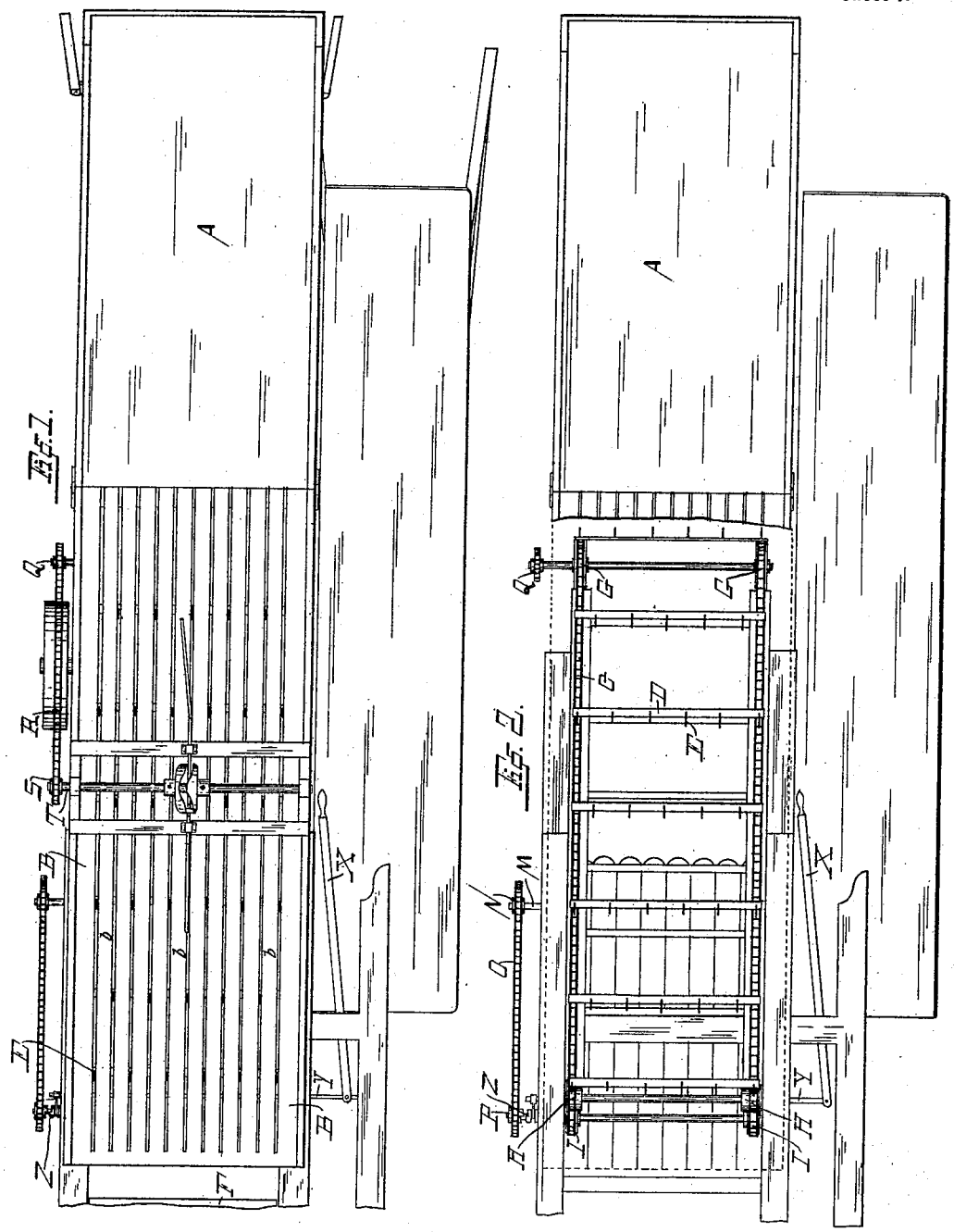
Witnesses. Inventor.
William Gutenkunst
By Erwin Wheeler & Wheeler,
Attorneys

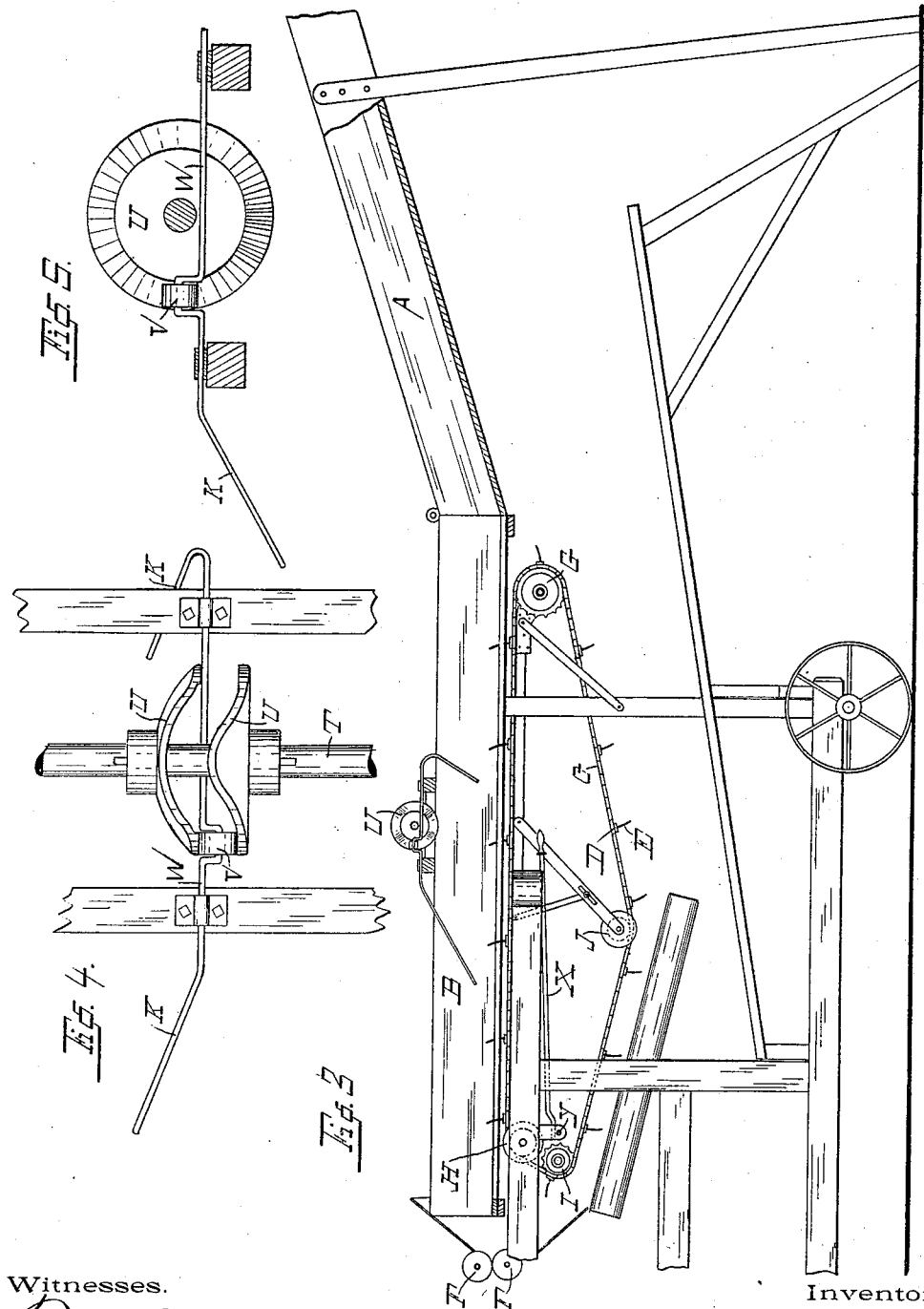

No. 614,859. Patented Nov. 29, 1898.
W. GUTENKUNST.
FEEDER FOR CORN HUSKING MACHINES.
(Application filed June 1, 1897.)
(No Model.) 3 Sheets—Sheet 3.
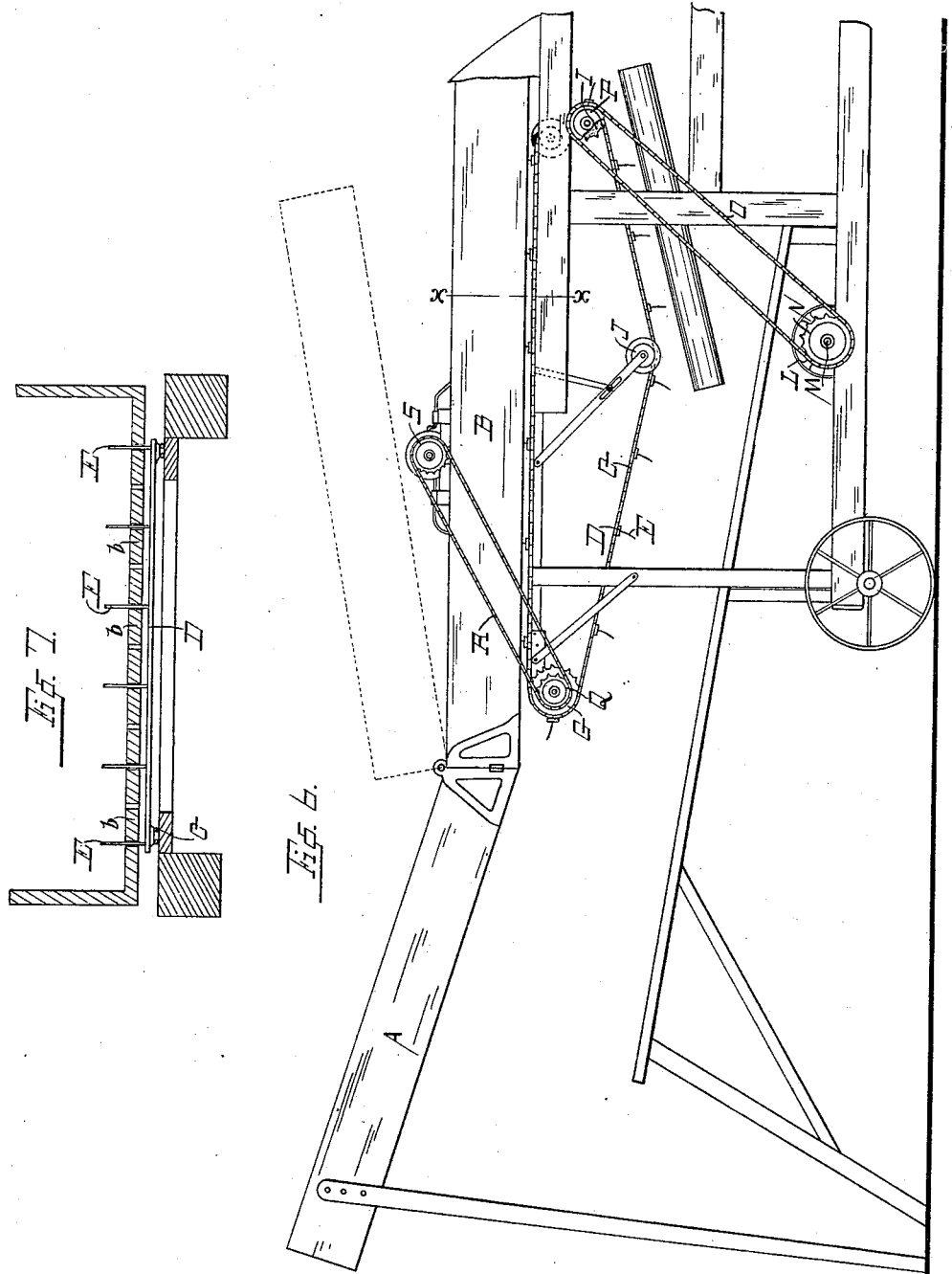
Witnesses.
Inventor.
William Gutenkunst
By Erwin Wheeler & Wheeler
Attorneys

UNITED STATES PATENT OFFICE.

WILLIAM GUTENKUNST, OF MILWAUKEE, WISCONSIN.

FEEDER FOR CORN-HUSKING MACHINES.

SPECIFICATION forming part of Letters Patent No. 614,859, dated November 29, 1898.

Application filed June 1, 1897. Serial No. 638,933. (No model.)

*To all whom it may concern:*

Be it known that I, WILLIAM GUTENKUNST, a citizen of the United States, residing at Milwaukee, in the county of Milwaukee and State of Wisconsin, have invented new and useful Improvements in Feeders for Corn-Husking Machines, of which the following is a specification.

My invention relates to improvements in feeders for corn-husking machines.

The objects of my invention are, first, to provide means for feeding the unhusked corn longitudinally to the breaking-rollers; second, to provide for distributing the bundle uniformly over the feeding-platform, and, third, to prevent the ears from clogging in the husking-rollers.

In the following description reference is had to the accompanying drawings, in which—

Figure 1 is a plan view of my invention. Fig. 2 is a similar view with the feed platform or rack removed to show the arrangement of the belt conveyer and feeding-hooks. Fig. 3 is a view of the left-hand side of my invention with the feed-rack and distributing device drawn in central longitudinal section and showing also the breaking and husking rollers of the corn-husking machine. Fig. 4 is a top view of the distributing device. Fig. 5 is a vertical section view of the same drawn on the axis of the crank-shaft which carries the distributing-arms. Fig. 6 is a right-hand view of my invention. Fig. 7 is a section view drawn on line *x x* of Fig. 6.

Like parts are identified by the same reference-letters throughout the several views.

The unhusked corn is fed in unbound bundles down the inclined feedway A upon a rack B, the bottom of which is formed of longitudinally-arranged slats *b b*, and the corn is fed forwardly over this rack to the breaking-rollers by means of a belt conveyer, comprising sprocket-chains C, cross-bars D, and feeding-hooks E, the latter being preferably given a forward bend or trend, as best shown in Figs. 3 and 6. The feeding hooks or fingers E project upwardly from the cross-bars in the spaces between the slats *b b* of the rack and not only feed the stalks forward, but tend to arrange them and hold them in a longitudinal position, which facilitates their passing between the breaking-rollers F F of the husking-machine. The belt conveyer passes over the end sprocket-wheels G and H, the latter being of small diameter, so as to cause the feeding hooks or fingers E to withdraw from between the slats of the rack with a short movement. The sprocket-wheel H is also located somewhat in advance of the wheel G, so as to cause the feeding-fingers to continue their forward movement while being withdrawn from the rack, thus preventing the fingers from catching in the stalks and pulling them downwardly. On its return side the belt is passed over the sprocket drive-wheels I and the belt-tightener pulleys J, which coöperate to hold that portion of the belt which passes above the husking-rollers in a position substantially parallel thereto, thus causing the feeding-hooks to remove any ears which have become caught or clogged in the husking-rollers.

For spreading the unhusked corn uniformly over the feed-rack I have located a distributing device above the feed-rack, which is provided with the downwardly and forwardly projecting oscillating arms K K, which preferably do not project in the same plane, but diverge laterally, and are adapted to brush the stalks from side to side in the rack as they are being fed forwardly by the feeding-hooks, the arms being of such length as to strike only those stalks which are in a raised position, either by reason of their being piled on other stalks or by reason of their being cramped or bent between the feeding-hooks.

Motion is communicated to the belt conveyer from the main drive-pulley L through shaft M, sprocket-wheel N, belt O, and sprocket-wheels P and I. An oscillating motion is communicated to the arms K K from the sprocket-wheel G of the belt conveyer through the pinion Q, belt R, pulley S, shaft T, cam U, pulley V, and crank-shaft W. The feeder is thrown in and out of gear by means of a lever X, rod Y, and clutch Z, whereby the sprocket-wheels P and I may be connected or disconnected at pleasure.

It will be observed that the belt conveyer and its feeding-fingers are arranged in such relation to the other portions of the machine as to perform the three-fold function of feeding the stalks forwardly, raking out the clogs in the husking-rollers, and coöperating with the distributing-arms K K in securing a uniform distribution of the stalks in the rack. Without the feeding-fingers the arms K K would not only fail to distribute the stalks uniformly, but would tend to turn them into a transverse position and otherwise snarl and tangle them.

Having thus described my invention, what I claim as new, and desire to secure by Letters Patent, is—

1. In a corn-husking machine, the combination with the breaking-rollers, and inclined husking-rollers adapted to receive the ears as they are separated from the stalks by the breaking-rollers, of an open or slotted rack leading to the breaking-rollers, and a belt conveyer, located beneath the rack and provided with feeding-fingers adapted to project upwardly on one side through the slots or openings in the rack, and downwardly on the return side of the belt, the latter being held in such relation to the husking-rollers as to rake out or dislodge the clogged husks and ears, substantially as described.

2. In a corn-husking machine, the combination of an open or slotted rack leading to the breaking-rollers of said machine, and a belt conveyer located underneath the rack and provided with feeding-fingers adapted to project upwardly through the slots or openings in the rack, said conveyer being arranged to pass over one or more adjustable pulleys or sprocket-wheels on its return side, whereby the same is held in a position parallel to the husking-rollers, with the feeding-fingers in a position to rake out the clogged ears, substantially as described.

3. In a corn-husking machine, the combination with the breaking-rollers, and inclined husking-rollers adapted to receive the ears of corn as they are separated from the stalks by the breaking-rollers, of an open or slotted rack leading to the breaking-rollers, a belt conveyer located beneath the rack and provided with feeding-fingers adapted to project upwardly on one side through the slots in the rack and downwardly on the return side of the belt, in proximity to the husking-rollers, and a spreading device located above the rack and provided with oscillatory arms adapted to rake laterally over the stalks, whereby the feeding-fingers are made to perform the three-fold function of feeding the stalks, raking out the clogged ears from the husking-rollers, and coöperating with the spreading-arms in securing a uniform distribution and alinement of the stalks, substantially as described.

In testimony whereof I affix my signature in the presence of two witnesses.

WILLIAM GUTENKUNST.

Witnesses:
 JAS. B. ERWIN,
 LEVERETT C. WHEELER.